(12) United States Patent
Menkedick et al.

(10) Patent No.: US 10,523,611 B2
(45) Date of Patent: Dec. 31, 2019

(54) SYSTEMS AND METHODS FOR ELECTRONICALLY DISTRIBUTING INFORMATION

(71) Applicant: QUEST DIAGNOSTICS INVESTMENTS INC., Wilmington, DE (US)

(72) Inventors: Douglas Menkedick, Guilford, IN (US); David Rapperport, Coconut Creek, FL (US); Maheswar Putta, Mason, OH (US)

(73) Assignee: QUEST DIAGNOSTICS INVESTMENTS INCORPORATED, Wilmington, DE (US)

( * ) Notice: Subject to any disclaimer, the term of this patent is extended or adjusted under 35 U.S.C. 154(b) by 0 days.

(21) Appl. No.: 16/227,786

(22) Filed: Dec. 20, 2018

(65) Prior Publication Data

US 2019/0124028 A1 Apr. 25, 2019

Related U.S. Application Data

(63) Continuation of application No. 15/900,560, filed on Feb. 20, 2018, now Pat. No. 10,164,926, which is a continuation of application No. 13/835,936, filed on Mar. 15, 2013, now Pat. No. 9,929,985.

(51) Int. Cl.
*G06F 15/16* (2006.01)
*H04L 12/58* (2006.01)
(52) U.S. Cl.
CPC .................................. *H04L 51/14* (2013.01)

(58) Field of Classification Search
None
See application file for complete search history.

(56) References Cited

U.S. PATENT DOCUMENTS

| | | |
|---|---|---|
| 5,325,294 A | 6/1994 | Keene |
| 5,897,493 A | 4/1999 | Brown |
| 5,926,526 A | 7/1999 | Rapaport |
| 6,182,118 B1 | 1/2001 | Finney et al. |
| 6,480,885 B1 | 11/2002 | Olivier |
| 7,034,691 B1 | 4/2006 | Rapaport et al. |
| 7,567,504 B2 | 7/2009 | Darling et al. |
| 8,510,472 B1 | 8/2013 | Anderson et al. |
| 2002/0120705 A1 | 8/2002 | Schiavone et al. |
| 2004/0111478 A1* | 6/2004 | Gross ............ H04L 51/00 709/206 |
| 2005/0174975 A1* | 8/2005 | Mgrdechian ...... G06Q 30/0207 370/338 |
| 2007/0168436 A1 | 7/2007 | Andam |
| 2012/0110077 A1 | 5/2012 | Merchant et al. |
| 2012/0198017 A1 | 8/2012 | LeVasseur et al. |

* cited by examiner

*Primary Examiner* — Phuoc H Nguyen
(74) *Attorney, Agent, or Firm* — Jon E. Gordon; Haug Partners LLP

(57) ABSTRACT

Embodiments of the invention include systems and methods for transmitting messages related to certain information while maintaining the confidentiality of that information. A potential recipient may register one or more devices for receipt of such messages while specifying rules regarding when different messages may be delivered to the various devices. To keep sensitive information confidential, the messages may include only a link to such sensitive information, but exclude the sensitive information itself. An authorized recipient may then use the link to access the sensitive information via a password-protected Web site.

10 Claims, 10 Drawing Sheets

SYSTEMS AND METHODS FOR ELECTRONICALLY DISTRIBUTING INFORMATION

COPYRIGHT NOTICE

This patent document contains material that is subject to copyright protection. The copyright owner has no objection to the facsimile reproduction by anyone of the patent document or the patent disclosure as it appears in the Patent and Trademark Office patent files or records but otherwise reserves all copyrights whatsoever.

BACKGROUND

The proliferation of ways to send messages has paradoxically made it harder to be sure that the right messages reach the right recipients at the right times. A sender may have to choose between email, instant messaging, and other forms of electronic communication. Sending a message via all available channels is one possible solution, but it runs the risk of overwhelming (or at least annoying) the recipients.

The problem is particularly complex when an urgent message involves confidential information. The most conveniently-accessed channels-voice mail and SMS, to give just two examples—are partially or wholly insecure. But using proprietary technologies creates problems for recipients, who may have to manage multiple different technologies on multiple devices if they are to receive messages from different senders.

For example, doctors may work with service providers, such as laboratories. A laboratory may need to send messages of varying levels of urgency to doctors: for example, doctors may need to be alerted variously about incomplete test orders, urgent test results, or problems with billing for performed tests. Some of these messages may need to be delivered immediately, yet any messaging technology must respect the confidentiality of legally protected healthcare information. And a physician may deal with many different laboratories and other service providers, which creates the risk that closed, proprietary systems may proliferate beyond usefulness.

BRIEF SUMMARY OF THE INVENTION

Embodiments of the invention relate to systems and methods for receipt and delivery of messages that may concern confidential information, e.g., confidential medical information. According to embodiments of the invention, a computer system may receive information, possibly from a third party, that comprises a message for delivery to a specified recipient. This information may include, e.g., text and, separately from the text, a reference to other, confidential information. The reference may be, e.g., a hyperlink to a password-protected Web site. The information may also include other information, including information that directly or indirectly identifies the recipient and/or information about the type and or importance of the confidential information.

For example, in an embodiment of the invention, a laboratory service provider may provision an account for a recipient (e.g., a doctor) with a messaging service provider. The laboratory service provider may subsequently send a message to the messaging service provider for delivery to the recipient, and this message may include text in one field and a hyperlink in another. The text may indicate that information (e.g., an urgent lab result) is available and whether that information is urgent, but may not itself include any protected information. The hyperlink may lead to a secure, password-protected Web page or pages from which an authorized user may retrieve the confidential information itself.

Further, in an embodiment of the invention, a potential recipient may register one or more devices with the messaging service provider. Devices may include, e.g., smartphones, tablets, and messaging clients installed on one or more computer systems. The recipient may also specify rules and/or conditions that control delivery of certain classes of messages to certain devices. For example, a physician may specify that alerts regarding billing problems are to be sent only to an administrator's computer and only during business hours, but urgent test results are to be sent to all of the physician's devices as soon as they become available.

According to embodiments of the invention, any one or more actions related to receipt and/or delivery may be logged, collectively and/or individually, e.g., to permit subsequent auditing. Thus, for example, receipt and delivery of a message according to an embodiment of the invention may create, e.g., a log entry corresponding to receipt of the message from the sender, individual log messages for each of the recipient's registered devices that indicate for each of the devices receipt of the message, presentation of the message to the recipient, acknowledgement by the user of the message, and accessing the associated confidential information, e.g., via the included hyperlink. These events may be logged separately: for example, receipt of the message by the device may be logged separately from presentation of the message to the user, which may in turn be logged separately from the user's acknowledgement of the message, and so on, or, alternatively, any two or more of these events may be logged together. Logging may be wholly or partly centralized and/or distributed.

According to an embodiment of the invention, a method of real-time messaging to healthcare professionals is performed by a computer system that comprises one or more processors and one or more interfaces operatively coupled to at least one of the processors. The method comprises receiving through at least one of the interfaces at least one of a plurality of messages that represent communication from a sender (e.g., a laboratory testing services provider) to a designated recipient (e.g., a doctor). The message may contain information formatted according to the sender's own identification records, without regard to the recipient's identification records.

According to the method, at least one of the processors, in response to receiving the message, executes instructions to process the content of the message. The content may include information relevant to the professionals, such as laboratory test processing in the healthcare industry, including but not limited to critical and non-critical test results, test orders, and billing information. In an embodiment, the system processes the information in the sender's message to identify individual recipient computing devices and determines which of the recipient computing devices should receive the sender's message. The computer system also transmits through at least one of the interfaces information to cause an electronic display device to present the content of the message to the designated recipient.

According to an embodiment, the message is comprised of at least a body field, a sender field, a message type field, and a link field. The link field can be configured to display a link to a Web page where the recipient can view personal health information in a secure manner.

According to an embodiment, the method described above can also include at least one of the processors generating a new message, the new message comprised of at least one message types. The message types include but are not limited to critical and non-critical test result messages, order messages, and billing messages. The new message contains the content of the sender's message and is transmitted to the designated recipient.

According to an embodiment, the method above includes transmitting through at least one of the interfaces information to cause an electronic display device to present a user interface. The user interface is configured to allow a designated recipient to customize the time that messages are transmitted to the recipient. The user interface also allows the recipient to customize the type of messages that are transmitted to the recipient. According to an embodiment, the recipient can also customize the transmission of messages based on location data sent from the recipient's computing devices.

According to an embodiment, the method above includes (i) receiving through at least one of the interfaces an acknowledgement message from the recipient, and (ii) transmitting through at least one of the interfaces the acknowledgement message to the sender.

According to an embodiment, the method above includes, (i) responsive to receipt of the acknowledgement message, executing instructions on at least one of the processors to process the content of the acknowledgement message to determine the recipient action that caused the acknowledgement message, and (ii) recording the recipient action to create an audit trail of the communication.

In embodiments of the invention, some or all steps of some or all of the above-described methods may be performed by or in connection with one or more computer systems. Such a computer system, according to an embodiment of the invention, may include one or more processors, one or more interfaces operatively coupled to at least one of the processors, one or more databases, and/or one or more computer-readable storage media.

Embodiments of the invention also include computer systems programmed to carry out the above-described methods and computer-readable storage media encoded with instructions that, when executed by one or more processors within a computer system, cause the computer system to carry out the above-described methods.

BRIEF DESCRIPTION OF THE DRAWINGS

The present invention will be understood more fully with reference to the drawings. The drawings are provided for the purpose of illustration and are not intended to limit the invention.

DETAILED DESCRIPTION OF PREFERRED EMBODIMENTS

Figure 1:
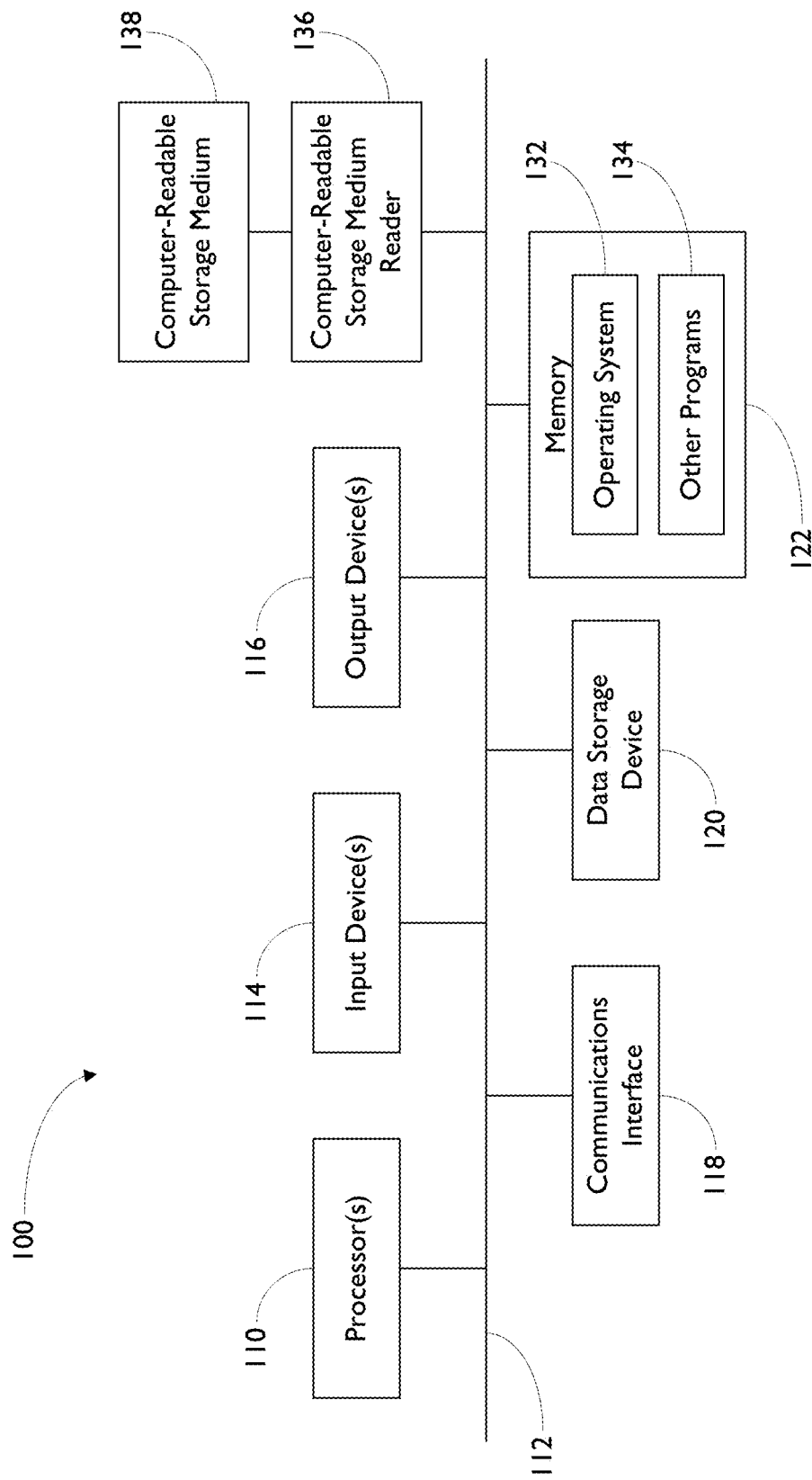
FIG. 1 is a block diagram depicting an exemplary computer system with which embodiments of the invention may at least partially be implemented.

Embodiments of the invention may be implemented by systems using one or more programmable digital computers. FIG. 1 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one data storage device 120 such as a magnetic disk or an optical disk, and memory 122 such as ROM and RAM, each coupled to the communications channel 112. The communications interface 118 may be coupled to a network (not depicted) such as the Internet.

Although the computer system 100 is shown in FIG. 1 to have only a single communications channel 112, a person skilled in the relevant arts will recognize that a computer system may have multiple channels (not depicted), including for example one or more busses, and that such channels may be interconnected, e.g., by one or more bridges. In such a configuration, components depicted in FIG. 1 as connected by a single channel 112 may interoperate, and may thereby be considered to be coupled to one another, despite being directly connected to different communications channels.

One skilled in the art will recognize that, although the data storage device 120 and memory 122 are depicted as different units, the data storage device 120 and memory 122 can be parts of the same unit or units, and that the functions of one can be shared in whole or in part by the other, e.g., as RAM disks, virtual memory, etc. It will also be appreciated that any particular computer may have multiple components of a given type, e.g., processors 110, input devices 114, communications interfaces 118, etc.

The data storage device 120 (FIG. 1) and/or memory 122 may store instructions executable by one or more processors or kinds of processors 110, data, or both. Some groups of instructions, possibly grouped with data, may make up one or more programs, which may include an operating system 132 such as, e.g., Microsoft Windows® 7, Linux®, Mac OS®, or Unix®. Other programs 134 may be stored instead of or in addition to the operating system. It will be appreciated that a computer system may also be implemented on platforms and operating systems other than those mentioned. Any operating system 132 or other program 134, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 100 (FIG. 1) may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 136, such as, e.g., a magnetic disk drive, magneto-optical drive, optical disk drive, or flash drive, may be coupled to the communications channel 112 for reading from a CRSM 138 such as, e.g., a magnetic disk, a magneto-optical disk, an optical disk, or flash memory. Alternatively, one or more CRSM readers may be coupled to the rest of the computer system 100, e.g., through a network interface (not depicted) or a communications interface 118. In any such configuration, however, the computer system 100 may receive programs and/or data via the CRSM reader 136. Further, it will be appreciated that the term "memory" herein is intended to include various types of suitable data storage media, whether permanent or temporary, including among other things the data storage device 120, the memory 122, and the CSRM 138.

(Unless explicitly stated otherwise, the term "computer-readable storage medium" herein specifically excludes transitory propagating signals, as should already be clear from the word "storage".)

Figure 2:
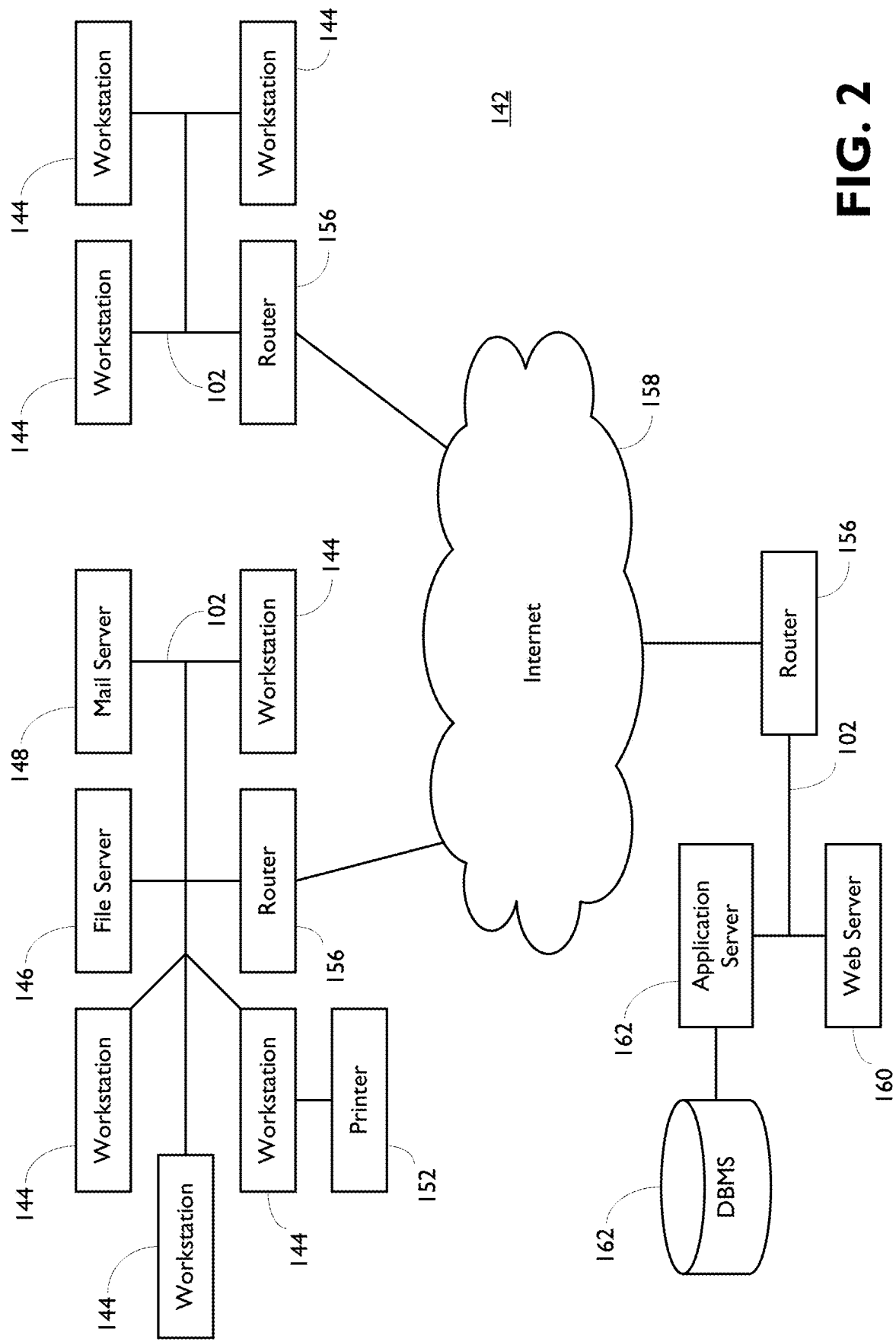
FIG. 2 is a block diagram depicting an exemplary interconnected network with which embodiments of the invention may at least partially be implemented.

Two or more computer systems 100 (FIG. 1) may communicate, e.g., in one or more networks, via, e.g., their respective communications interfaces 118 and/or network interfaces (not depicted). FIG. 2 is a block diagram depicting an example of one such interconnected network 142. Network 142 may, for example, connect one or more workstations 144 with each other and with other computer systems, such as file servers 146 or mail servers 148. A workstation 144 may comprise a computer system 100. The connection may be achieved tangibly, e.g., via Ethernet® or optical cables, or wirelessly, e.g., through use of modulated microwave signals according to the IEEE 802.11 family of standards. A computer workstation 144 or system 100 that participates in the network may send data to another computer workstation system in the network via the network connection.

One use of a network 142 (FIG. 2) is to enable a computer system to provide services to other computer systems, consume services provided by other computer systems, or both. For example, a file server 146 may provide common storage of files for one or more of the workstations 144 on a network 142. A workstation 144 sends data including a request for a file to the file server 146 via the network 142 and the file server 146 may respond by sending the data from the file back to the requesting workstation 144.

Further, a computer system may simultaneously act as a workstation, a server, and/or a client. For example, as depicted in FIG. 2, a workstation 144 is connected to a printer 152. That workstation 144 may allow users of other workstations on the network 142 to use the printer 152, thereby acting as a print server. At the same time, however, a user may be working at the workstation 144 on a document that is stored on the file server 146.

The network 142 (FIG. 2) may be connected to one or more other networks, e.g., via a router 156. A router 156 may also act as a firewall, monitoring and/or restricting the flow of data to and/or from the network 142 as configured to protect the network. A firewall may alternatively be a separate device (not pictured) from the router 156.

An internet may comprise a network of networks 142 (FIG. 2). The term "the Internet" refers to the worldwide network of interconnected, packet-switched data networks that uses the Internet Protocol (IP) to route and transfer data. For example, a client and server on different networks may communicate via the Internet 158, e.g., a workstation 144 may request a World Wide Web document from a Web server 160. The Web server 160 may process the request and pass it to, e.g., an application server 162. The application server 162 may then conduct further processing, which may include, for example, sending data to and/or receiving data from one or more other data sources. Such a data source may include, e.g., other servers on the same computer system 100 or LAN 102, or a different computer system or LAN and/or a database management system ("DBMS") 162.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

The terms "client" and "server" may describe programs and running processes instead of or in addition to their application to computer systems described above. Generally, a software client may consume information and/or computational services provided by a software server.

Figure 3:
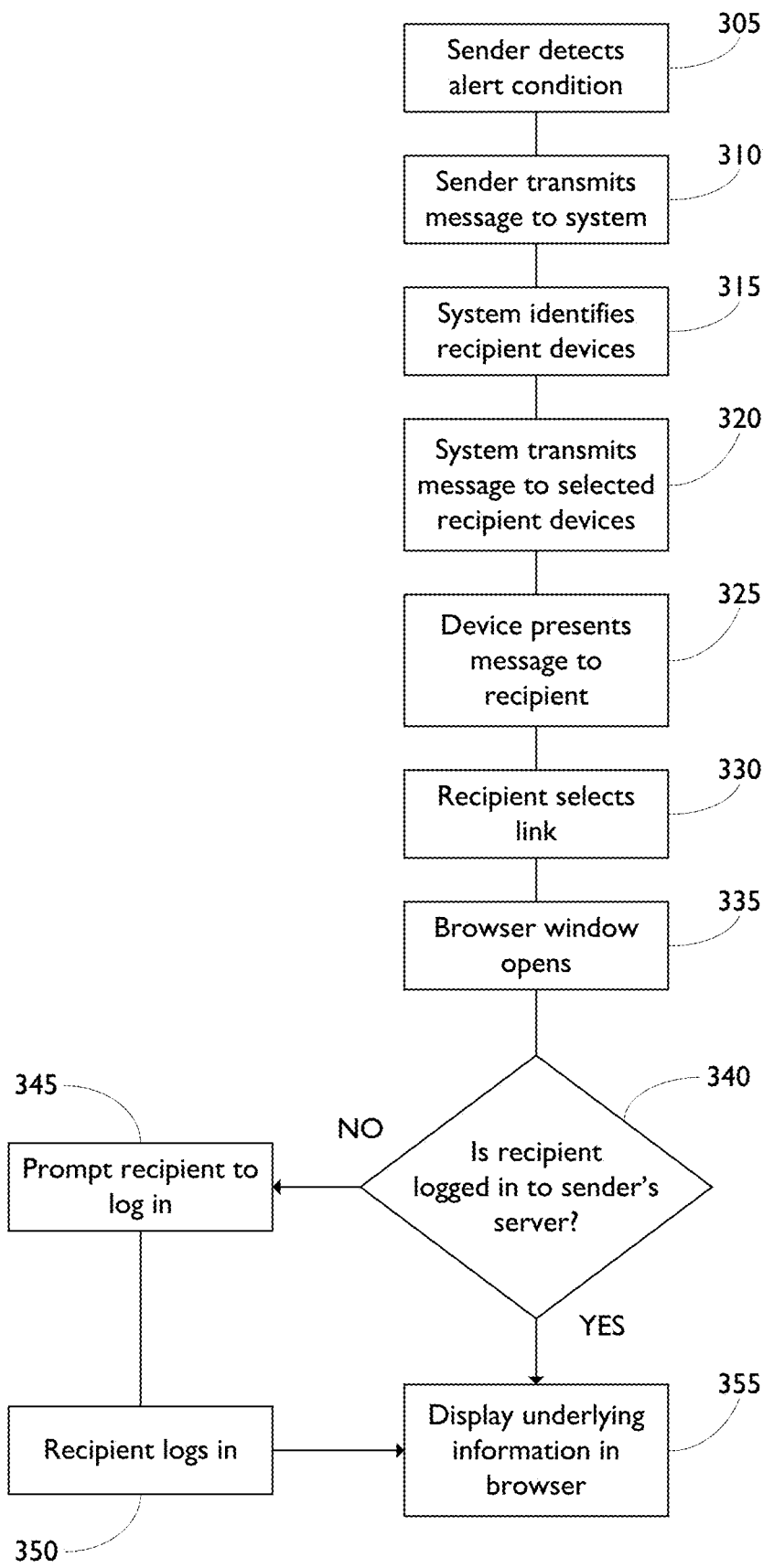
FIG. 3 depicts an example of a method of sending electronic messages according to an embodiment of the invention.

FIG. 3 depicts an example of a method of sending electronic messages according to an embodiment of the invention. The messages may be, e.g., alerts, which may be delivered over one or more viewing channels, such as, but not limited to, desktop computing devices, tablet computing devices, and mobile phones.

In an embodiment of the invention, the depicted method may be used to transmit messages, e.g., alerts to health care professionals. Senders or sources of alerts can be independent organizations, such as medical laboratories or insurance payers, using separate, heterogeneous computer systems, distinct from the computer system handling the receipt and transmission of communication messages. Recipients can include physicians and those who work with them. (These roles are solely illustrative, however, and are not limiting.)

As represented in block 305, in an embodiment, a sender detects an alert condition. For example, in the healthcare field, the alert condition can include, but is not limited to, actions resulting in laboratory test result information, critical test result information, test order information, billing support information, and any other information the sender wishes to communicate to a recipient, including chat or customer support information.

In block 310, according to an embodiment, the sender transmits the information representing the alert condition to one or more computer systems.

In block 315, after receiving the communication messages, the receiving and transmitting system reviews the content of the communication messages. In response, the receiving and transmitting system identifies the intended recipient and the intended recipient's devices using the information in the message from the sender. This identification may in an embodiment of the invention rely on information provided by both the sender and the recipient during their respective provisioning processes, described further below. Also as discussed below, this identification may depend on one or more rules and/or conditions specified, e.g., by the recipient.

According to an embodiment, in block 320, the system transmits the alert messages to the selected recipient's devices. As discussed below, the alert message may be received by a client application operating on the device, and this client may be either a general-purpose messaging application or a special-purpose application.

Figure 4:
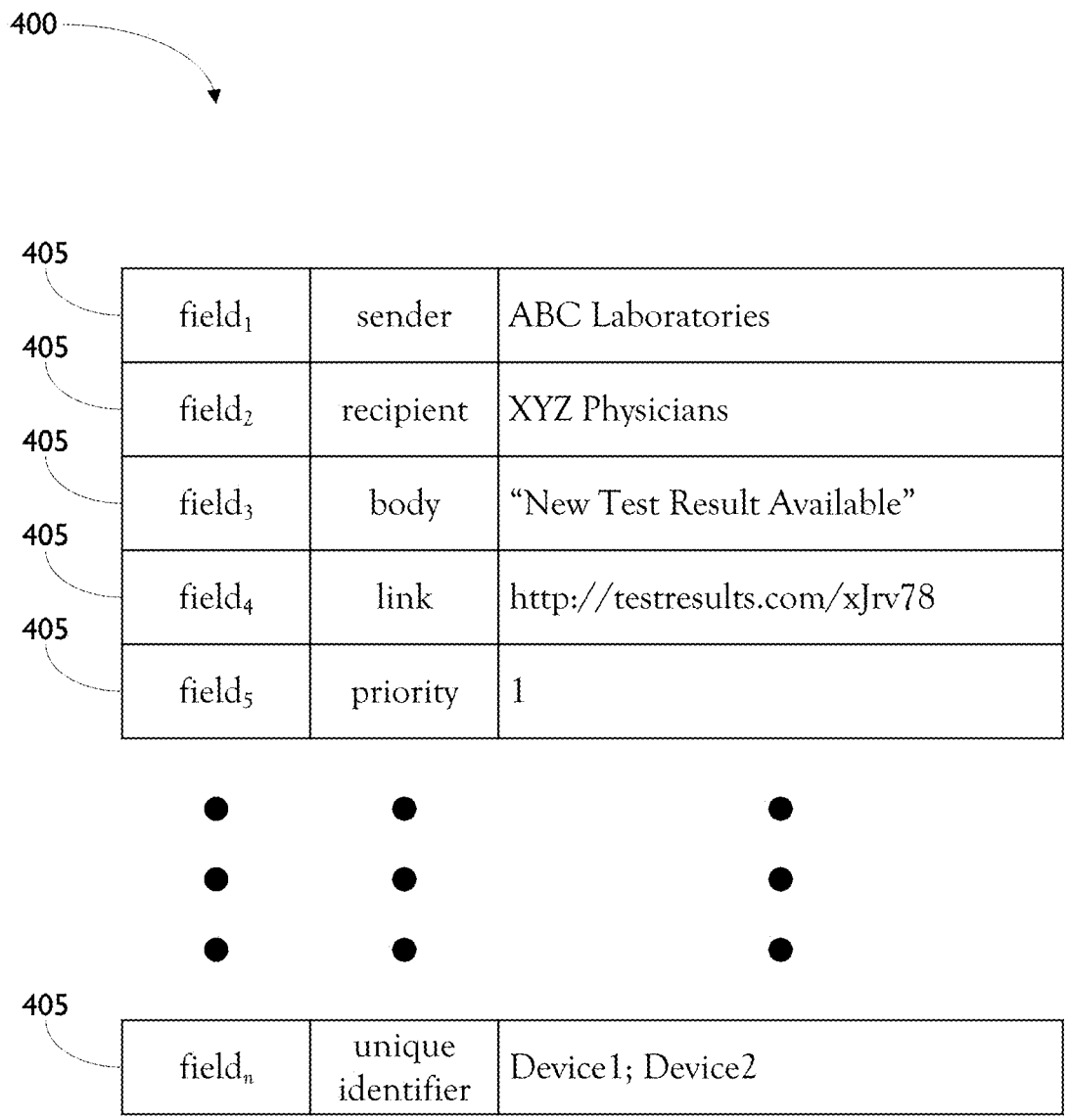
FIG. 4 depicts an exemplary diagram of a data structure representing a message according to an embodiment.

FIG. 4 depicts an exemplary diagram of a data structure 400 representing a message according to an embodiment. The messages that display on the recipient's device may include a body field 405 and a link field 405 to store the information from a sender. In an embodiment, the body of the message sent from the system does not contain any sensitive data, such as personal health information. For example, the body of a message from a laboratory intended to be transmitted through the system to a physician can solely read, "Critical Result Available." This ensures that sensitive personal health information will not be intercepted during the transmission of the message or by unauthorized access by someone other than the recipient. The term "personal health information" includes, but is not limited to, information such as demographic information, medical history, test and laboratory results, insurance information, and other data that is collected by healthcare professionals to identify individuals. The link can be, for example, a URL that directs the recipient to a display of the relevant personal health information relating to the message. The relevant personal health information can be displayed, for example, on a Web page that requires secure login access by authorized users in order to view the personal health information of a patient.

The message configuration allows messages 400 to be sent over insecure channels without risking the disclosure of sensitive information. Because no personal health information is transmitted in the body field 405 of a message, the interception of the message during the transmission of a message 400 over a network from the receiving and transmitting system to a recipient's device or devices poses little risk of unauthorized users gaining access to the secure information. As discussed below, the link field 405 of the message can direct the user to an appropriate, secure avenue for the receipt of the personal health information and sensitive data.

In an embodiment, authorized recipients are designated in the message 400 by the sender. When a sender is registered to use the receiving and transmitting system and is granted the ability to communicate to recipients using the system, the sender need not provide any other details about the recipient; specifically, the sender need not include any addressing information. For example, in the healthcare setting, the sender uses its own physician identification, account, or customer number to designate the intended recipient. The receiving and transmitting system identifies the recipient and recipient devices using the system's own processes, which may include internal mapping tables.

According to an embodiment, and referenced in FIG. 4, the messages can also include other fields 405 available for senders to use to increase the amount of information sent to recipients. In an embodiment, a message category field 405 is required to identify the category that the message belongs to. Examples of message categories include, but are not limited to, critical laboratory test results, non-critical laboratory test results, marketing messages, and system information. Messages 400 may also include priority fields 405 for senders to customize the priority level of a message. For example, a health insurance company may opt to give a message a priority level of 1 if the message refers to an account that is 90 days past due, but give a message a priority level of 3 if the message refers to an account that is only 30 days past due. In an embodiment, messages may contain an expiration date field. An expiration date field allows a sender to set an expiration date for the message. These fields 405 can be used, for example, to set a deadline for an action requested by the sender in the message. In an embodiment, expired messages will not be transmitted by the system to the designated recipient.

Referring back to FIG. 3, in block 320, after the receiving and transmitting system processes the information in the message, including the recipient identification, the system matches the recipient identification used by the sender with the corresponding recipient identification in the system's internal mapping table. The system then transmits the message to the designated recipient over a network.

In block 325, the recipient's device displays the message to the recipient. In an embodiment, the device may be configured to display the message according to the instructions of the recipient. The recipient details these instructions using a customizable user interface, which is described in further detail below.

In an embodiment, as depicted in block 330, if the message that is transmitted from the receiving and transmitting system to the recipient device includes a link field and the link field is populated with an active link, the recipient can select the link. As depicted in block 335, in an embodiment, the recipient's device is configured to open a network browser window according to the link contained in the message. This allows the recipient to access information that is not included in the insecure fields of the message. In an embodiment, the link may direct a recipient to the sender's own secure server to view the sensitive data.

In block 340, the sender's server ensures that only an authorized recipient views the sensitive data referenced in the link by determining if the recipient is currently logged in to the sender's server with valid credentials. If the recipient is not logged in, as block 345 represents, the sender's server prompts the recipient to enter valid credentials, which the recipient can complete in block 350. In block 355, once a recipient has either entered valid credentials or the sender server detects that the recipient is already authorized to access the sender server, the sender server is configured to display the underlying sensitive information, such as personal health information, to the recipient via the browser window.

Figure 5:
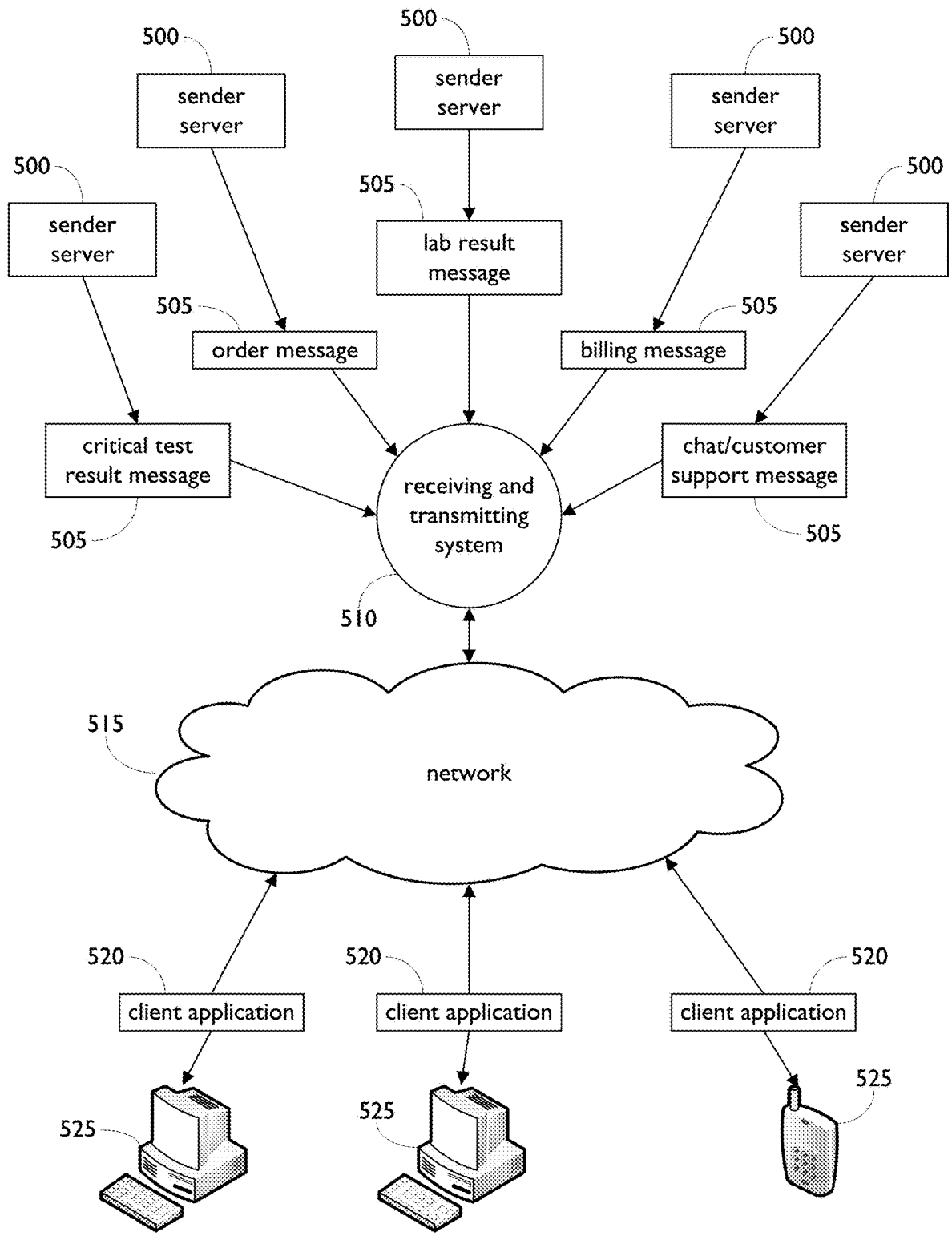
FIG. 5 depicts an exemplary diagram of senders and recipients in a receiving and transmitting communication system.

FIG. 5 depicts an exemplary diagram of senders 500 and recipients 525 in a receiving and transmitting communication system. Senders 500 transmit information contained in messages 505 to the system 510 over a network 515 to a recipient's computing devices that are registered with the system 510.

In an embodiment, for a recipient to register a computing device 525, the recipient must complete a provisioning process. The provisioning process is initiated by the recipient, and may in an embodiment of the invention begin with installing a client application 520 on the recipient's computing device 525. The client application 520 may be stored, e.g., in the computing device's volatile and/or persistent memory, and it may control the interactions between the receiving and transmitting system 510 and the computing device 525.

During installation or during subsequent configuration, the client application 520 may create a device ID unique to the recipient's computing device 525. This information may associate the installed device ID with the routes the recipient can receive notifications from. (A "route" for this purpose is a particular device associated with the recipient that has the client application 520 installed where the notifications can be sent.) For its part, the receiving and transmitting system 510 may store the device ID and/or other information associated with the recipient, e.g., in one or more tables in one or more databases. This storing may in an embodiment of the invention include marking the device ID as having been used, to prevent other client applications 520 from registering the same device ID.

According to an embodiment, the client application 520 on a recipient's computing device 525 can be configured to poll the receiving and transmitting system 510 over a network 515 for any messages 505 for the recipient. The frequency of the polling may be client configurable to adjust the time between queries from the client application 520 to the receiving and transmitting system 510. The receiving and transmitting system 510 may be configured to filter the messages 505 for the recipient that have expired (e.g., the time to complete the action required in the message has expired) and the messages 505 that have not been delivered to the recipient.

To authenticate the transmitted messages 505 between the receiving and transmitting system 510 and the client application 520, an embodiment of the invention allows for the creation of a unique hash to accompany every message 505 that travels to and from the system 510. This hash can be created using MD5 or other algorithm and may include information specific to the message, a time and/or date related to the message, and/or information specific to the sender, recipient, and/or device.

In an embodiment, for a sender 500 to register with the system 510, it must also go through a provisioning process. The sender's server 520 will make a call to an application programming interface ("API") to provide information about the sender's system. This information can include, but is not limited to, contact information, such as the first and last name, email address, or telephone number of the sender contained in the system. Identification information specific to a professional's industry can be used, such as the National Provider Identifier ("NPI") of a physician. In an embodiment, when directed for use by healthcare professionals, it is important that the provisioning process capture information such as the different patient and administrative data the sender has on potential recipients in their own system so the receiving and transmitting system's processes can match the recipient's identification information to the sender's own identification information submitted in a message. Any other unique identifier of potential recipients in the source system can also be provided during the provisioning process. When present, the unique identifier can be used to filter a specific recipient within an organization to publish a notification to the specific recipient's client application.

In an embodiment, after a sender 500 has registered with the system 510, when a recipient installs the client application and registers the computing device's device ID, the receiving and transmitting system ties the sender system's information representing the recipient received via provisioning to the recipient's device ID. The process of tying the sender's own identification identifying a recipient and the recipient's own identification information may be performed by at least one of the processors in the receiving and transmitting application via a mapping table. This process also facilitates more efficient communication between parties and provides advanced means to transmit messages to recipients that do not share common identifying information.

Figure 6:
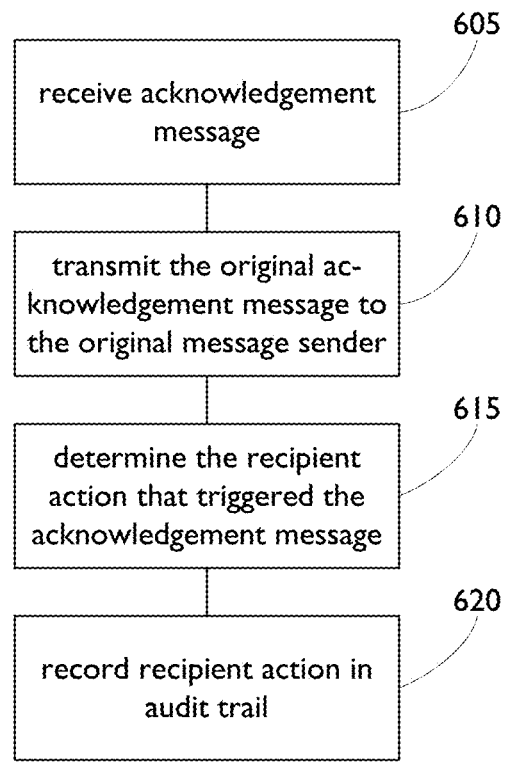
FIG. 6 depicts a block diagram of process by which the receiving and transmitting system records acknowledgement messages.

FIG. 6 depicts a block diagram of process by which the receiving and transmitting system 510 records acknowledgement messages. In block 605, the system 510 receives an acknowledgement message from a client application 520 once the recipient acts upon a recipient message. As represented in block 610, the system 510 transmits the acknowledgement message to the sender of the original message 505. The sender of the original message 505 can then take the acknowledgement message and process it for its own records. An audit trail can be created from the sender's records to increase future efficiency and resolve any future problems arising from the laboratory test processing. In block 615, in an embodiment, the system 510 may record the audit trail itself. To do so, the system 510 determines the action the recipient took that triggered the acknowledgement message. Recipient actions may include, but are not limited to, actions such as the recipient opening, deleting, or responding to a message 505. In block 620, the system 510 records the information contained in the acknowledgement message to create an audit trial. In an embodiment, the process depicted in FIG. 6 can be repeated every time the recipient and/or a device and/or client application associated with the recipient performs an action affecting the message. Thus, according to an embodiment of the invention, an audit trail may be created to track the receipt of the message, the display of the message on a recipient's device, and any action the recipient performs on information including in the message, such as selecting a link displayed in the link field.

Figure 7:
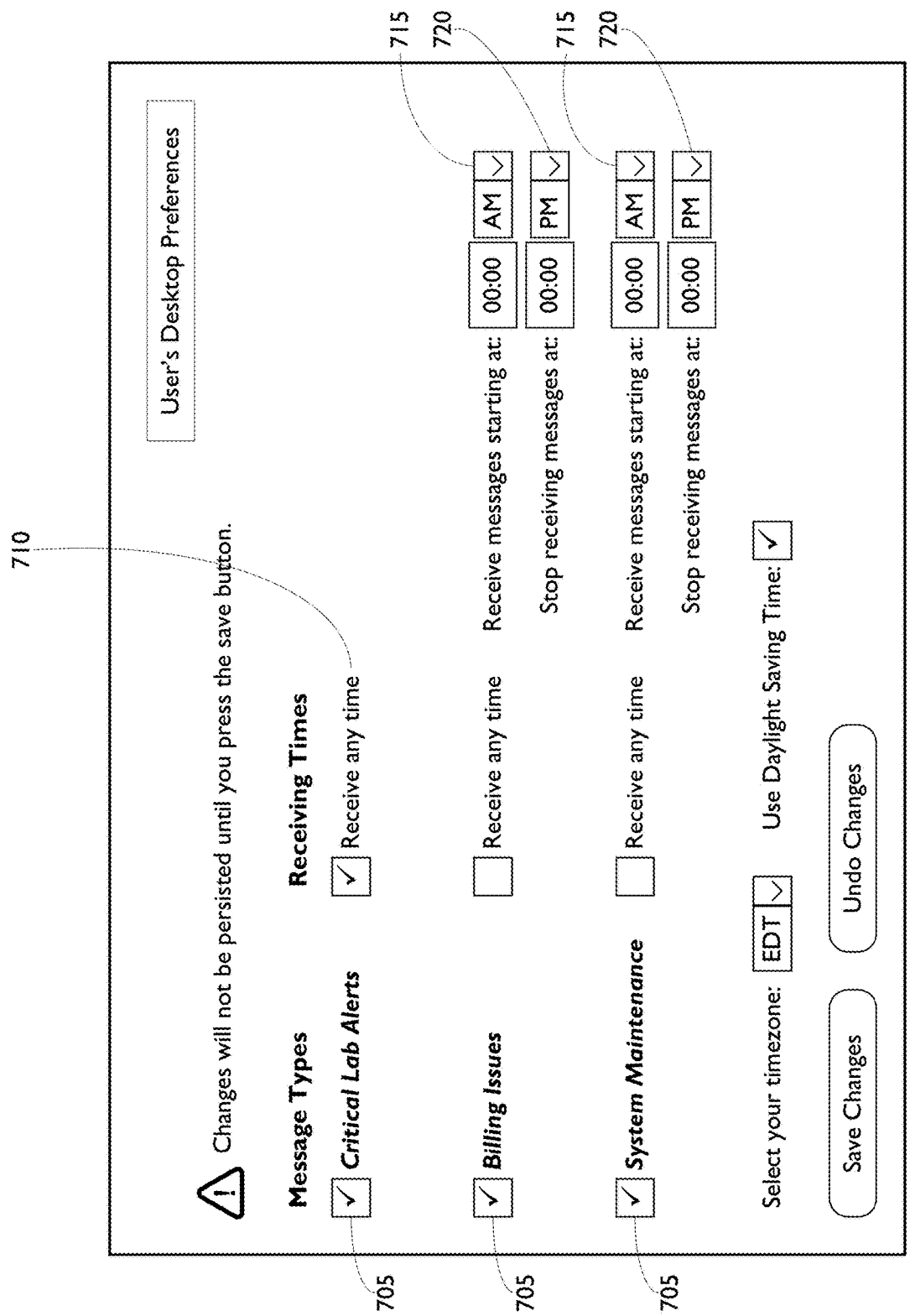
FIG. 7 depicts an exemplary user interface to allow a recipient to customize the transmission of messages to a client application.

FIG. 7 depicts an exemplary user interface to allow a recipient to customize the transmission of messages to a client application 520. In an embodiment, the receiving and transmitting system 510 can be configured to transmit through at least one of the interfaces instructions that present a user interface on an electronic display device. A recipient can use the user interface to configure the system 510 to send messages to the recipient's devices 525 selected by the time and type. For example, a physician may direct that alerts from an insurance company about billing are to be sent only to the client application 520 on an administrator's computer 525 and only during business hours, while a critical laboratory test result may be sent to client applications 520 on all of the recipient's registered devices 525, regardless of the time. In an embodiment, the recipient is presented with a user interface on each client application 520 that displays options to customize the receipt of messages 505. This allows the recipients to customize each individual computing device that is registered with the receiving and transmitting system 510 through a client application 520.

According to an embodiment, the recipient may select elements of the user interface 705, such as a check box or tick box on a graphical user interface, to select the type of message 505 the recipient wants to customize. According to the recipient's interaction with the element 705, the user interface can display a separate user interface element 710 for the recipient to select whether they want to customize the time during which messages 505 will be sent to the client application 520. If the recipient interacts with element 710 to indicate that the recipient would like to customize message receipt time, the user interface can be configured to display additional user interface elements 715 and 720. Element 715 allows a recipient to set the daily start time for the client application 520 to receive messages 505, while element 720 adjusts the daily end time that the client application 520 stops receiving messages 505.

In an embodiment, a recipient may further customize the transmission settings of messages to recipient devices by location data. The user interface may display options that take advantage of a recipient's devices that can transmit location data to the receiving and transmitting system. For example, a recipient can configure a client application on a computing device capable of transmitting location data to accept alerts only when the recipient is within a certain distance from a designated location. Thus, a physician may configure the system to send alert messages to the client device on his or her mobile device when the device is more than 20 miles away from the physician's office.

According to an embodiment, a recipient may be able to customize the receipt of messages based on other varying criteria, such as, but not limited to, back-up or alternative devices. For example, a recipient may designate an alternative device for the receipt of critical alert messages. Thus, if the receiving and transmitting system attempts to send a message to a primary device but fails to receive an acknowledgement message confirming receipt of the message on the recipient's device, the system can be configured to send the message to the alternative device to ensure that critical alerts are received by the necessary parties.

Figure 8:
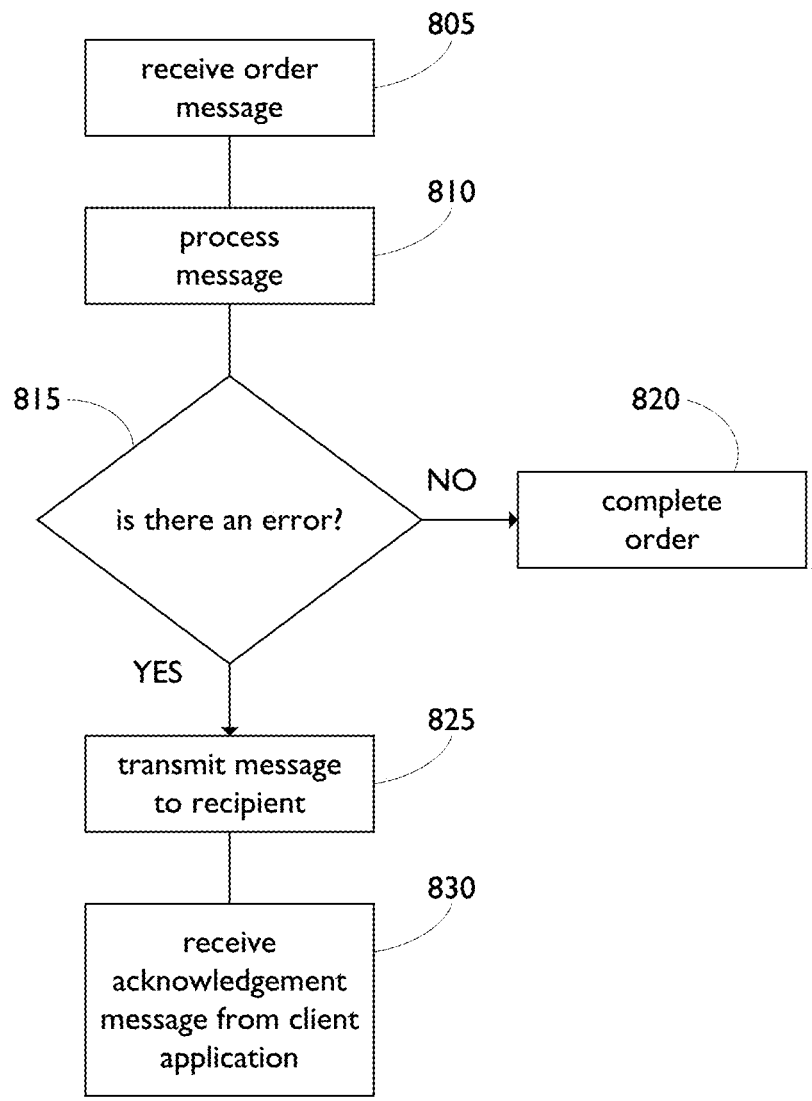
FIG. 8 shows an exemplary flow diagram of the process the receiving and transmitting system uses for test order messages.

As an example of the receiving and transmitting system used in the healthcare field, FIG. 8 shows a flow diagram of the process the receiving and transmitting system 510 uses for test order messages. The receiving and transmitting system 510 first receives the order message from a sender system 500 in block 805. In block 810, the receiving and transmitting system 510 begins to process the message sent from the sender 500. In the course of processing the message, the system 510 determines whether the order contains an error, as represented in block 815. Using conventional methods, order processors at laboratories would have to resolve errors through means such as telephone calls. In an embodiment of the invention, when an error is discovered during order processing, in block 825, the system 510 transmits the message to the recipient for immediate action. Block 830 depicts the act of the client application 520 sending an acknowledgement message back to the receiving and transmitting system 510. The acknowledgement message ensures that the original sender or system can log the receipt of the message and determine if the error is in the process of being resolved by the recipient.

Figure 9:
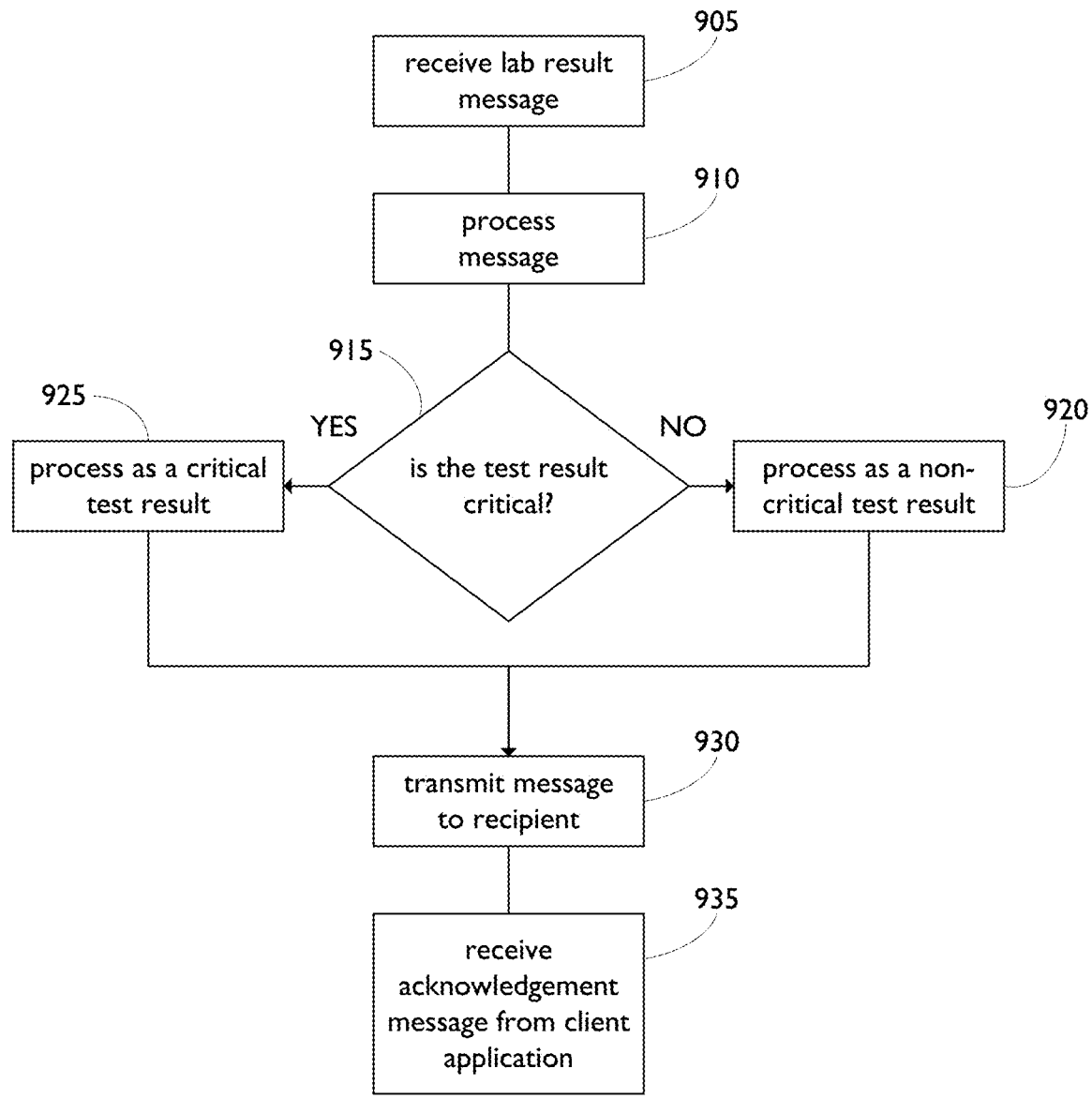
FIG. 9 depicts an exemplary flow diagram of the process the receiving and transmitting system uses for laboratory test result messages.

FIG. 9 depicts an exemplary flow diagram of the process the receiving and transmitting system uses for laboratory test result messages in the healthcare context. In block 905, the system receives the laboratory test result message from the sender. The message is processed, as depicted in blocks 910 and 915, to determine if the laboratory test result is a critical laboratory test result. If the message is a critical result, the message is transmitted to the designated recipient, in block 930, according to the recipient's critical result instructions, if the recipient has customized their settings with the receiving and transmitting system with respect to critical result messages. If the message is not a critical result, the message is transmitted to the recipient according to the recipient's normal test result instructions. In block 935, to record the recipient's actions, the system 510 receives an acknowledgement message from the recipient's client application 520 and transmits it to the original sender and/or records it for the audit trail.

Figure 10:
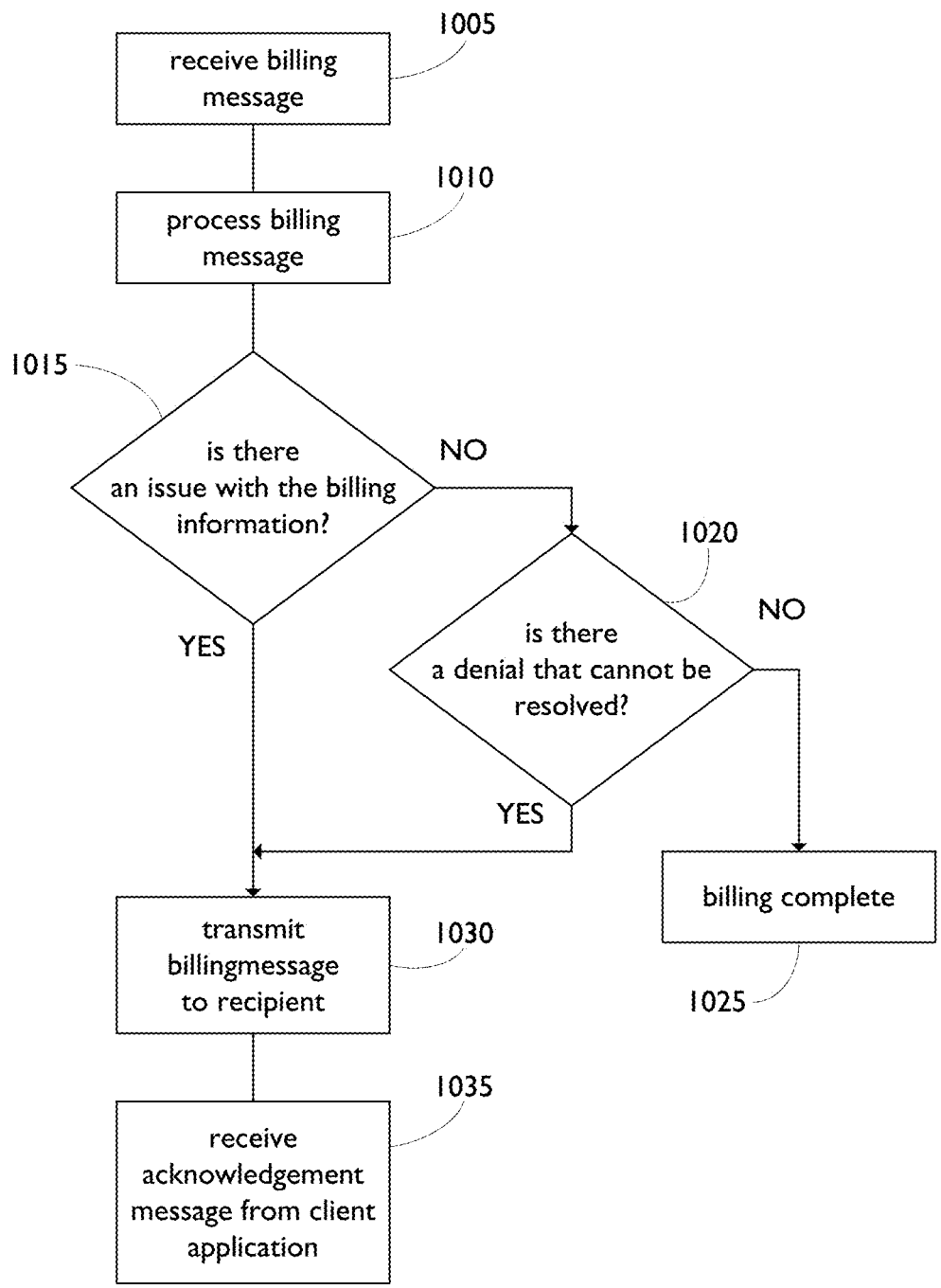
FIG. 10 depicts an exemplary flow diagram of the process the receiving and transmitting system uses for billing messages.

FIG. 10 depicts an exemplary flow diagram of the process the receiving and transmitting system 510 uses for billing messages. As with other message types, and shown in block 1005, the system 510 receives billing messages from senders outside of the system 510. The system 510 then starts to process the billing message in block 1010. In processing the billing message, the system 510 first determines whether there is an initial issue with the billing information including in the billing message, as shown in block 1015. If the system 510 determines that there is an issue with the billing information, the system 510 can immediately send the recipient the message to fix the issue in block 1030. If the system 510 determines that the billing information contains no errors and presents no issues, the system 510 then determines, in block 1020, whether the billing information contains a payment denial that cannot be resolved without the recipient's input. If the system 510 determines that the payment denial cannot be resolved without the recipient's input, then the system 510 moves to transmit the message to the recipient in block 1030 so that the recipient can handle the denial and prevent the payment from becoming bad debt. In block 1035, to record the recipient's actions, the system 510 receives an acknowledgement message from the recipient's client application 520 and transmits it to the original sender and/or records it for the audit trail.

It is noted in this disclosure, and particularly in the claims and/or paragraphs, that when an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

The present invention has been illustrated and described with respect to specific embodiments thereof, which embodiments are merely illustrative of the principles of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with the claims that follow.

We claim:

1. A method of routing electronic messages in a data network comprising a plurality of sender computer systems and a plurality of user devices, the method being performed by a routing computer system that comprises a database and participates in the data network, the method comprising:
  storing in the database
    (a) mapping data that associates each of a plurality of sender-user identifiers respectively with exactly one of a plurality of users and further associates each of the sender-user identifiers respectively with exactly one of a plurality of senders,
    (b) device data that associates each of the user devices respectively with exactly one of the users, and
    (c) a plurality of routing criteria, each of the routing criteria being associated respectively in the database with exactly one of the users;
  receiving from one of the sender computer systems, via the data network, a message from one of the senders to one of the users, the message comprising text, a reference to additional information, and one of the sender-user identifiers, the one of the sender-user identifiers being associated with both the one of the senders and the one of the users, and the text, the reference, and the sender-user identifier each being distinct from each other;
  responsive to receipt of the message and based on the one of the sender-user identifiers, retrieving one or more of the routing criteria associated with the one of the users and, applying one or more of the retrieved routing criteria, identifying for receipt of the message one or more of the user devices associated with the user; and
  transmitting via the data network information to cause the identified one or more of the user devices to present information comprised by the message;
  wherein:
    the message is sent at a time;
    at least one of the applied routing criteria is based on the time;
    the message comprises type information specifying a type for the message, the type information being distinct from the text, the reference, and the one of the sender-user identifiers; and
    at least one of the applied routing criteria is based on the type information.

2. The method of claim 1, wherein the transmitted information comprises the text and the reference, neither the text nor the reference containing the other in the transmission.

3. The method of claim 2, wherein the reference is a hyperlink to information that is provided by the sender separately from the message.

4. The method of claim 3, wherein the target of the hyperlink is a Web page that includes patient health information.

5. The method of claim 1, comprising receiving from the first device geolocation data associated with a current physical location of the first device, wherein:
  the device registration data comprises data that associates with the one of the users a first user device of the plurality of user devices and one or more additional user devices of the plurality of user devices;
  the first user device is not one of the additional user devices; and
  the applied routing criteria comprise one or more location criteria such that the routing computer system transmits the transmitted information to the first user device if the geolocation data satisfies one or more of the location criteria, and otherwise transmits the transmitted information to one or more of the additional user devices but not to the first user device.

6. A routing computer system for routing electronic messages in a data network that comprises a plurality of sender computer systems and a plurality of user devices, the routing computer system comprising a database, wherein:
  the database comprises
    (a) mapping data that associates each of a plurality of sender-user identifiers respectively with exactly one of a plurality of users and further associates each of the sender-user identifiers respectively with exactly one of a plurality of senders,
    (b) device data that associates each of the user devices respectively with exactly one of the users, and
    (c) a plurality of routing criteria, each of the routing criteria being associated respectively in the database with exactly one of the users; and
  the routing computer system is programmed to carry out a method comprising:
    receiving from one of the sender computer systems, via the data network, a message from one of the senders to one of the users, the message comprising text, a reference to additional information, and one of the sender-user identifiers, the one of the sender-user identifiers being associated with both the one of the senders and the one of the users, and the text, the reference, and the sender-user identifier each being distinct from each other;
    responsive to receipt of the message and based on the one of the sender-user identifiers, retrieving one or more of the routing criteria associated with the one of the users and, applying one or more of the retrieved routing criteria, identifying for receipt of the message one or more of the user devices associated with the user; and
    transmitting via the data network information to cause the identified one or more of the user devices to present information comprised by the message;
  wherein:
    the message is sent at a time;
    at least one of the applied routing criteria is based on the time;
    the message comprises type information specifying a type for the message, the type information being distinct from the text, the reference, and the one of the sender-user identifiers; and
    at least one of the applied routing criteria is based on the type information.

7. The routing computer system of claim 6, wherein the transmitted information comprises the text and the reference, neither the text nor the reference containing the other in the transmission.

8. The routing computer system of claim 7, wherein the reference is a hyperlink to information that is provided by the sender separately from the message.

9. The routing computer system of claim 8, wherein the target of the hyperlink is a Web page that includes patient health information.

10. The routing computer system of claim 6, wherein:
  the method comprises receiving from the first device geolocation data associated with a current physical location of the first device;
  the device registration data comprises data that associates with the one of the users a first user device of the plurality of user devices and one or more additional user devices of the plurality of user devices;
  the first user device is not one of the additional user devices; and the applied routing criteria comprise one or more location criteria such that the routing computer system transmits the transmitted information to the first user device if the geolocation data satisfies one or more of the location criteria, and otherwise transmits the transmitted information to one or more of the additional user devices but not to the first user device.

* * * * *